(12) United States Patent
Kurapati et al.

(10) Patent No.: US 9,197,746 B2
(45) Date of Patent: Nov. 24, 2015

(54) SYSTEM, METHOD AND APPARATUS FOR AUTHENTICATING CALLS

(75) Inventors: Srikrishna Kurapati, Richardson, TX (US); Rajesh Mohan, Sunnyvale, CA (US); Karthikeyan Sadhasivam, Richardson, TX (US); Satyam Tyagi, Richardson, TX (US)

(73) Assignee: Avaya Inc., Basking Ridge, NJ (US)

( * ) Notice: Subject to any disclaimer, the term of this patent is extended or adjusted under 35 U.S.C. 154(b) by 1312 days.

(21) Appl. No.: 12/366,630

(22) Filed: Feb. 5, 2009

(65) Prior Publication Data

US 2009/0217039 A1 Aug. 27, 2009

Related U.S. Application Data

(60) Provisional application No. 61/026,470, filed on Feb. 5, 2008.

(51) Int. Cl.
*H04L 9/32* (2006.01)
*H04M 3/436* (2006.01)
*H04L 29/06* (2006.01)

(52) U.S. Cl.
CPC .............. *H04M 3/436* (2013.01); *H04L 9/3215* (2013.01); *H04L 9/3231* (2013.01); *H04L 9/3273* (2013.01); *H04L 63/126* (2013.01); *H04L 63/1441* (2013.01); *H04L 63/1483* (2013.01); *G06F 2221/2103* (2013.01); *G06F 2221/2107* (2013.01); *H04L 2209/56* (2013.01); *H04M 2203/6054* (2013.01)

(58) Field of Classification Search
USPC .................. 738/168–170; 380/248, 249, 270; 455/420, 410–413; 713/168–170; 379/207.12, 93.24; 370/352–356
See application file for complete search history.

(56) References Cited

U.S. PATENT DOCUMENTS

| | | | |
|---|---|---|---|
| 4,371,752 A * | 2/1983 | Matthews et al. | 379/88.26 |
| 5,289,542 A * | 2/1994 | Kessler | 380/257 |
| 5,581,610 A | 12/1996 | Hooshiari | |
| 6,137,782 A | 10/2000 | Sharon et al. | |
| 6,324,271 B1 * | 11/2001 | Sawyer et al. | 379/142.05 |
| 6,363,065 B1 | 3/2002 | Thornton et al. | |
| 6,598,183 B1 | 7/2003 | Grieco et al. | |
| 6,665,293 B2 | 12/2003 | Thornton et al. | |
| 6,757,823 B1 | 6/2004 | Rao et al. | |
| 6,769,016 B2 | 7/2004 | Rothwell et al. | |
| 6,781,955 B2 | 8/2004 | Leung | |

(Continued)

OTHER PUBLICATIONS

Summers, Password policy: the good, the bad, and the ugly, 2004, WISICT '04 Proceedings of the winter international synposium on Information and communication technologies.*

(Continued)

*Primary Examiner* — Nirav B Patel
(74) *Attorney, Agent, or Firm* — Sheridan Ross P.C.

(57) ABSTRACT

The present invention provides a system, method and apparatus for authenticating calls that is a robust Anti-vishing solution. The present invention can identify Caller ID spoofing, verify dialed number to detect man-in-the middle and verify called party against dialed digits to detect impersonation. This solution can handle calls coming from any phone any where with little impact on user experience. Two separate solutions are tailored for smart phones (communication devices capable of running application software) and traditional phones to reduce the impact to user experience while providing robust verification.

10 Claims, 9 Drawing Sheets

(56) References Cited

U.S. PATENT DOCUMENTS

| | | | |
|---|---|---|---|
| 6,789,193 B1* | 9/2004 | Heiden | 713/175 |
| 6,842,449 B2 | 1/2005 | Hardjono | |
| 7,113,577 B2* | 9/2006 | Cook et al. | 379/142.01 |
| 7,181,010 B2 | 2/2007 | Russ et al. | |
| 7,239,688 B1* | 7/2007 | Sayko et al. | 379/93.02 |
| 7,693,269 B2* | 4/2010 | Sung et al. | 379/142.05 |
| 2002/0129236 A1 | 9/2002 | Nuutinen | |
| 2003/0009699 A1 | 1/2003 | Gupta et al. | |
| 2003/0070069 A1* | 4/2003 | Belapurkar et al. | 713/155 |
| 2004/0042470 A1 | 3/2004 | Cooper et al. | |
| 2004/0083299 A1 | 4/2004 | Dietz et al. | |
| 2004/0086093 A1 | 5/2004 | Schranz | |
| 2004/0161086 A1 | 8/2004 | Buntin et al. | |
| 2004/0176069 A1* | 9/2004 | Boatwright | 455/410 |
| 2004/0260560 A1 | 12/2004 | Holloway et al. | |
| 2005/0015488 A1 | 1/2005 | Bayyapu | |
| 2005/0043014 A1* | 2/2005 | Hodge | 455/411 |
| 2005/0044363 A1* | 2/2005 | Zimmer et al. | 713/170 |
| 2005/0084087 A1* | 4/2005 | Rajagopalan et al. | 379/205.01 |
| 2005/0132060 A1 | 6/2005 | Mo et al. | |
| 2005/0193201 A1* | 9/2005 | Rahman et al. | 713/169 |
| 2005/0201363 A1 | 9/2005 | Gilchrist et al. | |
| 2005/0249214 A1 | 11/2005 | Peng | |
| 2005/0259667 A1 | 11/2005 | Vinokurov et al. | |
| 2006/0028980 A1 | 2/2006 | Wright | |
| 2006/0036727 A1 | 2/2006 | Kurapati et al. | |
| 2006/0233160 A1* | 10/2006 | Kawanishi et al. | 370/352 |
| 2007/0076853 A1 | 4/2007 | Kurapati et al. | |
| 2007/0083918 A1* | 4/2007 | Pearce et al. | 726/5 |
| 2007/0121596 A1 | 5/2007 | Kurapati et al. | |
| 2007/0204060 A1 | 8/2007 | Higuchi et al. | |
| 2008/0016334 A1 | 1/2008 | Kurapati et al. | |
| 2008/0016515 A1 | 1/2008 | Naim et al. | |
| 2008/0086646 A1* | 4/2008 | Pizano | 713/189 |
| 2008/0137828 A1* | 6/2008 | Chmaytelli | 379/142.01 |
| 2009/0094671 A1 | 4/2009 | Kurapati et al. | |
| 2009/0144820 A1 | 6/2009 | Kurapati et al. | |
| 2009/0168756 A1 | 7/2009 | Kurapati et al. | |
| 2010/0197293 A1* | 8/2010 | Shem-Tov | 455/420 |

OTHER PUBLICATIONS

Hidden Markov Model Toolkit, http://htk.eng.cam.ac.uk/; Sep. 9, 2005; accessed though www.archive.org on Jul. 9, 2007.

http://www.bell-labs.com/project/tts/voices.html; Sep. 11, 2005; accessed though www.archive.org on Jul. 9, 2007.

http://www.dli2.nsf.gov/; Nov. 28, 2003.

http://www.ipodder.org/; Sep. 4, 2005; accessed though www.archive.org on Jul. 9, 2007.

http://www.microsoft.com/reader/developers/downloads/tts.asp; Sep. 8, 2005; accessed though www.archive.org on Jul. 9, 2007.

http://www.naturalvoices.att.com/; Sep. 13, 2005; accessed though www.archive.org on Jul. 9, 2007.

Tyson, Jeff and Valdes, Robert, "How VoIP Works" http://computer.howstuffworks.com/ip-telephony.htm; Sep. 23, 2006; accessed though www.archive.org on Jul. 9, 2007.

Commercial Libraries, Data Compression—Speech, http://datacompression.info/Speech.shtml, accessed May 2005.

Data Compression Download Source Codes and Papers. http://www.data-connpression.com/download.shtml, accessed May 2005.

Hidden Markov Model Toolkit, http://htk.eng.cam.ac.uk/.

http://www.bell-labs.com/project/tts/voices.html.

http://www.dli2.nsf.gov/.

http://www.ipodder.org/.

http://www.microsoft.com/reader/developers/downloads/tts.asp.

http://www.naturalvoices.att.com/.

ITU-T. Recommendation G.191, Software Tool Library 2000 User's Manual. ITU, Geneva, Dec. 2000.

ITU-T. Recommendation G.711, Pulse code molulation (PCM) of voice frequencies, volume Fascicle III.4 of Blue Book, pp. 175-184. ITU, Geneva, 1989.

ITU-T. Recommendation G.729, Coding of Speech at 8 kbps using Conjugate-Structure Algebraic-Code-Excited Linear-Prediction (CS-ACELP). ITU, Geneva, Mar. 1996.

Speech Compression, http://www.data-compression.com/speech.shtml, accessed May 2005.

Stein, L. D. and Stewart, J. N., "The World Wide Web Security FAQ, Version 3.1.2, Feb. 4, 2002," http://www.w3.org/Security/Faq/.

Tyson, Jeff and Valdes, Robert, "How VoIP Works" http://computer.howstuffworks.com/ip-telephony.htm.

US Congress, CAN-SPAM Act of 2003, http://www.spamlaws.com/federal/108s877.shtml.

International Search Report and Written Opinion for PCT/US2006/035903 dated Apr. 23, 2007.

International Search Report and Written Opinion for PCT/US2006/031499 dated May 24, 2007.

International Search Report and Written Opinion for PCT/US2007/073290 dated Apr. 15, 2008.

International Search Report and Written Opinion for PCT/US2007/073298 dated Aug. 21, 2008.

International Search Report and Written Opinion for PCT/US2007/014871 dated Sep. 11, 2008.

* cited by examiner

SYSTEM, METHOD AND APPARATUS FOR AUTHENTICATING CALLS

PRIORITY CLAIM

This patent application is a non-provisional application of U.S. provisional patent application 61/026,470 filed on Feb. 5, 2008; which is incorporated herein by reference in its entirety.

FIELD OF THE INVENTION

The present invention relates generally to the field of communications and, more particularly, to a system, method and apparatus for authenticating calls.

BACKGROUND OF THE INVENTION

Caller identification (Caller ID) is one of the most trusted ways of identifying who is calling and is commonly used to effectively filtering incoming calls. Telecommunication networks are designed in such a way that the Caller ID is usually delivered to the called device by the telecommunication operators. With a traditional phone system, it is hard to spoof Caller ID. But with the advent of IP Telephony, a caller can easily spoof Caller ID using techniques and tools freely available on the Internet. More importantly, the caller can be anywhere in the world where Internet Protocol (IP) connectivity is available to perform these operations.

In addition, when someone calls a number and leaves a message to call back, the recipient commonly believes the message and callback number associated with the message. Hackers can exploit this trusted call back behavior for their scams using called ID spoofing and geographic independence.

One such attack recently termed as "Vishing" (Voice variant of well known web/email phishing) has serious consequences to the financial and banking industry. A hacker sitting in a foreign country with freely available tools, such as asterisk PBX, can launch thousands or millions of automated calls. By spoofing Caller ID, the attacker pretends to be the bank or financial institution to solicit confidential information that could lead to theft of the target's financial assets. Similarly, the attacker can leave thousands or millions of messages to callers to call back a number different from the legitimate bank's numbers. Since banks have hundreds of numbers to provide various services, the customer is led to believe that the number is legitimate. The attacker can, with freely available tools, impersonate the bank's caller center and can collect confidential information. In addition, the attacker can act like a man-in-the-middle (MITM) between the customer and bank in order to easily obtain confidential information of the target.

As a result, Caller ID does not necessarily reveal the true identity of a caller. Moreover, in today's world of self-service and virtual customer service, it is becoming increasingly more difficult to associate Caller ID with the caller and calling number with the called party. There is, therefore, a need for a system, method and apparatus for authenticating calls.

SUMMARY OF THE INVENTION

The present invention provides a system, method and apparatus for authenticating calls that is a robust Anti-vishing solution. The present invention can identify Caller ID spoofing, verify dialed number to detect man-in-the middle and verify called party against dialed digits to detect impersonation. This solution can handle calls coming from any phone any where with little impact on user experience. Two separate solutions are tailored for smart phones (communication devices capable of running application software) and traditional phones to reduce the impact to user experience while providing robust verification.

More specifically, the present invention provides a method for authenticating a calling device in response to receiving a call from the calling device. A first authentication request is sent to the calling device. A first authentication response is received from the calling device, wherein the first authentication response includes a calling device encrypted data generated by the calling device using a caller identification, a called number and a shared secret encryption key. The caller identification and the called number are extracted from the encrypted data using the shared secret encryption key. The call is transferred to a called device whenever the extracted caller identification and the extracted called number are valid. Note that this method can be implemented on a computer readable medium wherein the steps are performed by one or more code segments.

In addition the present invention provides an apparatus for authenticating a calling device that includes a communications interface and a processor communicably coupled to the communications interface. The processor (a) receives a call from the calling device, (b) sends a first authentication request to the calling device, (c) receives a first authentication response from the calling device, wherein the first authentication response includes a calling device encrypted data generated by the calling device using a caller identification, a called number and a shared secret encryption key, (d) extracts the caller identification and the called number from the encrypted data using the shared secret encryption key, (e) determines whether the extracted caller identification and the extracted called number are valid, and (f) transfers the call to a called device whenever the extracted caller identification and the extracted called number are valid.

Moreover, the present invention provides a system for authenticating a calling device that includes a communications network communicably coupled to the calling device and a controller communicably coupled to the communications network. The controller includes a communications interface communicably coupled to the communications network and a processor communicably coupled to the communications interface. The processor (a) receives a call from the calling device, (b) sends a first authentication request to the calling device, (c) receives a first authentication response from the calling device, wherein the first authentication response includes a calling device encrypted data generated by the calling device using a caller identification, a called number and a shared secret encryption key, (d) extracts the caller identification and the called number from the encrypted data using the shared secret encryption key, (e) determines whether the extracted caller identification and the extracted called number are valid, and (f) transfers the call to a called device whenever the extracted caller identification and the extracted called number are valid. The calling device (a) initiates the call, (b) receives the first authentication request, (c) generates the calling device encrypted data, and (d) sends the first authentication response.

The present invention also provides a method for authenticating a user of a calling device in response to receiving a call from the calling device. The call is terminated and a new call is placed to the calling device. The user is prompted to speak one or more words and depress one or more keys on a calling device. The spoken words and one or more signals associated with the depressed keys are received. One or more biometric parameters of the received spoken words are compared with a stored voice biometric template for the user, the received spoken words are compared with the prompted words and the received signals are compared with the signals associated with the prompted keys. The new call is transferred to a called device whenever the user is authenticated as a result of the comparison. Note that this method can be implemented on a computer readable medium wherein the steps are performed by one or more code segments.

In addition, the present invention provides an apparatus for authenticating a user of a calling device that includes a communications interface and a processor communicably coupled to the communications interface. The processor (a) receives a call from the calling device via the communications interface, (b) terminates the call, (c) places a new call to the calling device via the communications interface, (d) prompts the user to speak one or more words and depress one or more keys on a calling device, (e) receives the spoken words and one or more signals associated with the depressed keys via the communication interface, (f) authenticates the user by comparing one or more biometric parameters of the received spoken words with a stored voice biometric template for the user, the received spoken words with the prompted words and the received signals with the signals associated with the prompted keys, and (g) transfers the new call to a called device whenever the user is authenticated.

Moreover, the present invention provides a system for authenticating a user of a calling device that includes a communications network communicably coupled to the calling device and a controller communicably coupled to the communications network. The controller includes a communications interface communicably coupled to the communications network and a processor communicably coupled to the communications interface. The processor (a) receives a call from the calling device via the communications interface, (b) terminates the call, (c) places a new call to the calling device via the communications interface, (d) prompts the user to speak one or more words and depress one or more keys on the calling device, (e) receives the spoken words and one or more signals associated with the depressed keys via the communication interface, (f) authenticates the user by comparing one or more biometric parameters of the received spoken words with a stored voice biometric template for the user, the received spoken words with the prompted words and the received signals with the signals associated with the prompted keys, and (g) transfers the new call to a called device whenever the user is authenticated.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to voice communications in a telecommunications network, but it will be understood that the concepts of the present invention are applicable to any communications session, network or device.

The present invention provides a system, method and apparatus for authenticating calls that is a robust Anti-vishing solution. The present invention can identify Caller ID spoofing, verify dialed number to detect man-in-the middle and verify called party against dialed digits to detect impersonation. This solution can handle calls coming from any phone any where with little impact on user experience. Two separate solutions are tailored for smart phones (communication devices capable of running application software) and traditional phones to reduce the impact to user experience while providing robust verification. Note that the present invention can be incorporated, integrated or combined with other voice communication protection systems, such as:

U.S. patent application Ser. No. 10/917,771 filed Aug. 13, 2004 entitled "System and Method for Detecting and Preventing Denial of Service Attacks in a Communications System";

U.S. patent application Ser. No. 11/502,244 filed Aug. 9, 2006 entitled "System and Method for Providing Network Level and Nodal Level Vulnerability Protection in VoIP Networks" which is a non-provisional application of U.S. Patent Application Ser. No. 60/706,950 filed Aug. 9, 2005;

U.S. patent application Ser. No. 11/521,427 filed Sep. 14, 2006 entitled "System, Method and Apparatus for Classifying Communications in a Communications System" which is a non-provisional application of U.S. Patent Application Ser. No. 60/717,065 filed Sep. 14, 2005;

U.S. patent application Ser. No. 11/769,609 filed Jun. 27, 2007 entitled "System, Method and Apparatus for Classifying Communications in a Communications System" which is a non-provisional application of U.S. Patent Application Ser. No. 60/817,445 filed Jun. 29, 2006;

U.S. patent application Ser. No. 11/776,509 filed Jul. 11, 2007 entitled "System, Method and Apparatus for Securely Exchanging Security Keys and Monitoring Links in a IP Communications Network" which is a non-provisional application of U.S. Patent Application Ser. No. 60/830,168 filed Jul. 12, 2006;

U.S. patent application Ser. No. 11/776,549 filed Jul. 11, 2007 entitled "System, Method and Apparatus for Troubleshooting an IP Network" which is a non-provisional application of U.S. Patent Application Ser. No. 60/830,411 filed Jul. 12, 2006;

U.S. patent application Ser. No. 12/028,781 filed Feb. 8, 2008 entitled "System, Method and Apparatus for Clientless Two Factor Authentication in VoIP Networks" which is a non-provisional application of U.S. Patent Application Ser. No. 60/888,765 filed Feb. 8, 2007; and U.S. patent application Ser. No. 12/189,151 filed Aug. 9, 2008 entitled "System, Method and Apparatus for Providing Security in an IP-Based End User Device" which is a non-provisional application of U.S. Patent Application Ser. No. 60/955,037 filed Aug. 10, 2007.

Figure 1:
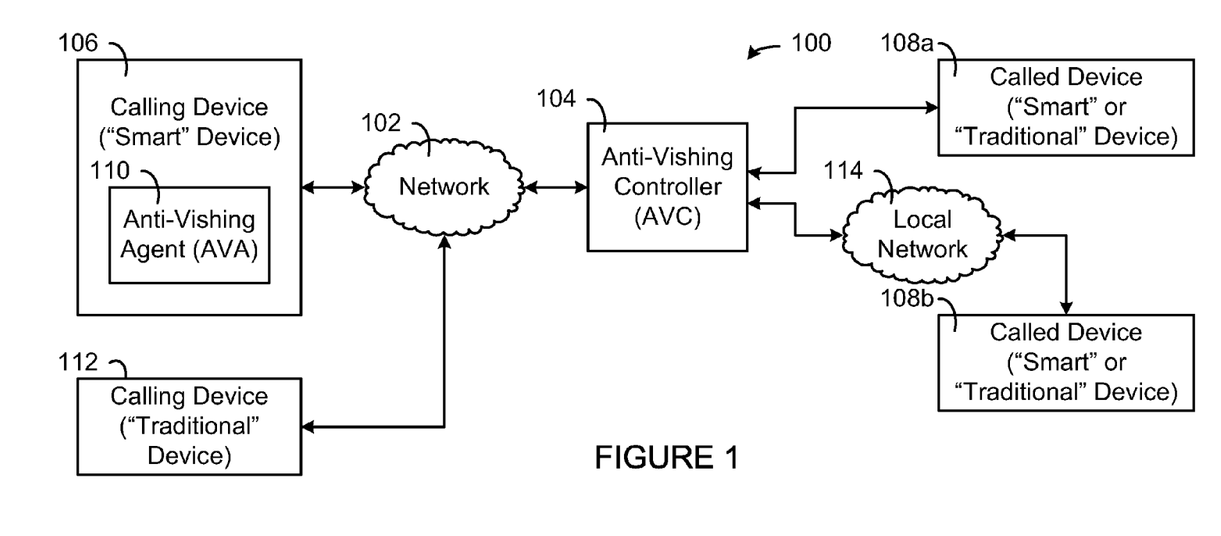
FIG. 1 is a block diagram of a system in accordance with one embodiment of the present invention.
Figure 2:
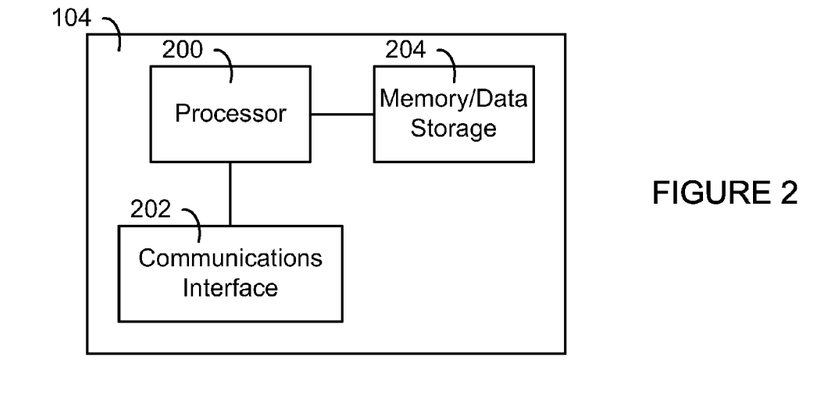
FIG. 2 is a block diagram of an apparatus in accordance with one embodiment of the present invention.

All of the foregoing applications are incorporated herein by reference in their entirety Now referring to FIGS. 1 and 2, block diagrams of a system 100 and an apparatus 104 in accordance with one embodiment of the present invention are shown. The system 100 includes a communications network 102, a controller 104 (Anti-Vishing Controller or AVC) communicably coupled to the communications network 102, and a calling device (smart device) 106 and/or a calling device (traditional device) 112 communicably coupled to the communications network 102. Calling device 106 includes an Anti-Vishing Agent (AVA) 110, whereas calling device 112 does not. The calling device 106 can be any type of user communications device, such as a phone (e.g., cell phone, PDA phone, IP Phone, softphone, etc.), a computer, a PDA or other any communications device capable of running the AVA 110 application. The calling device 112 can be any communications device that is not running an AVA 110 application, such as a land line phone, pay phone, cell phone, etc. The called device (smart device or traditional device) or called party 108 is communicably coupled to the controller 104 via integration, direct connection (as shown with called device 108a) or through a local network 114 (as shown with called device 108b). The controller 104 includes a processor 200 communicably coupled to a communications interface 202 and a memory or data storage device 204. The communications interface 202 is communicably coupled to the communications network 102, the called device 108a, and the called device 108b via the local network 114.

The AVC 104 can be a computer, a server, a switch, a PBX, a gateway or other suitable device and can be operated by the called party, a network provider, a service provider, a facility provider or a call center. The AVA 110 and AVC 104 use various in-band and out-of-band communication channels to exchange information to validate authenticity of caller ID, dialed digits and/or the called party. In-band communication can be done through DTMF, modem, voice signals and out-of-band communication can be done through SMS, SIP, and other VoIP control protocols where necessary.

Figure 3:
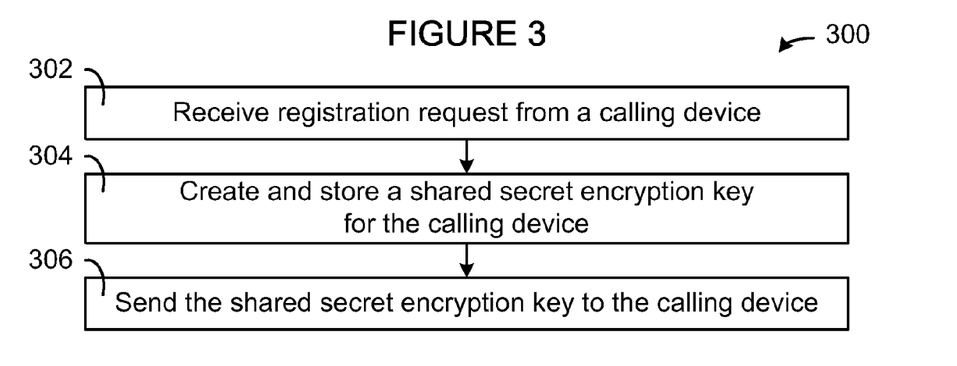
FIG. 3 is a flow chart depicting a registration process for a calling device in accordance with one embodiment of the present invention.

Referring now to FIG. 3, a flow chart depicting a registration process 300 for a calling device 106 in accordance with one embodiment of the present invention is shown. A registration request is received from the calling device 106 in block 302. In response, the AVC 104 creates and stores a shared secret encryption key for the calling device 106 in block 304. The shared secret encryption key is an initial unique encryption key (secret) established during the registration of the calling device 106 with entities like banks or other entities dealing with confidential, personal or proprietary information. As a result, the shared secret encryption key is created and known to the endpoints before the authentication process described below. An identifier that is unique to the calling device 106, such as a cell phone IMSI/MIN, is required to register the calling device 106. The shared secret encryption key is sent to the calling device 106 in block 306. Note that the shared secret encryption key can be recycled frequently to ensure that brute-force attacks do not succeed. Note also that this method can be implemented on a computer readable medium wherein the steps are performed by one or more code segments.

Figure 4:
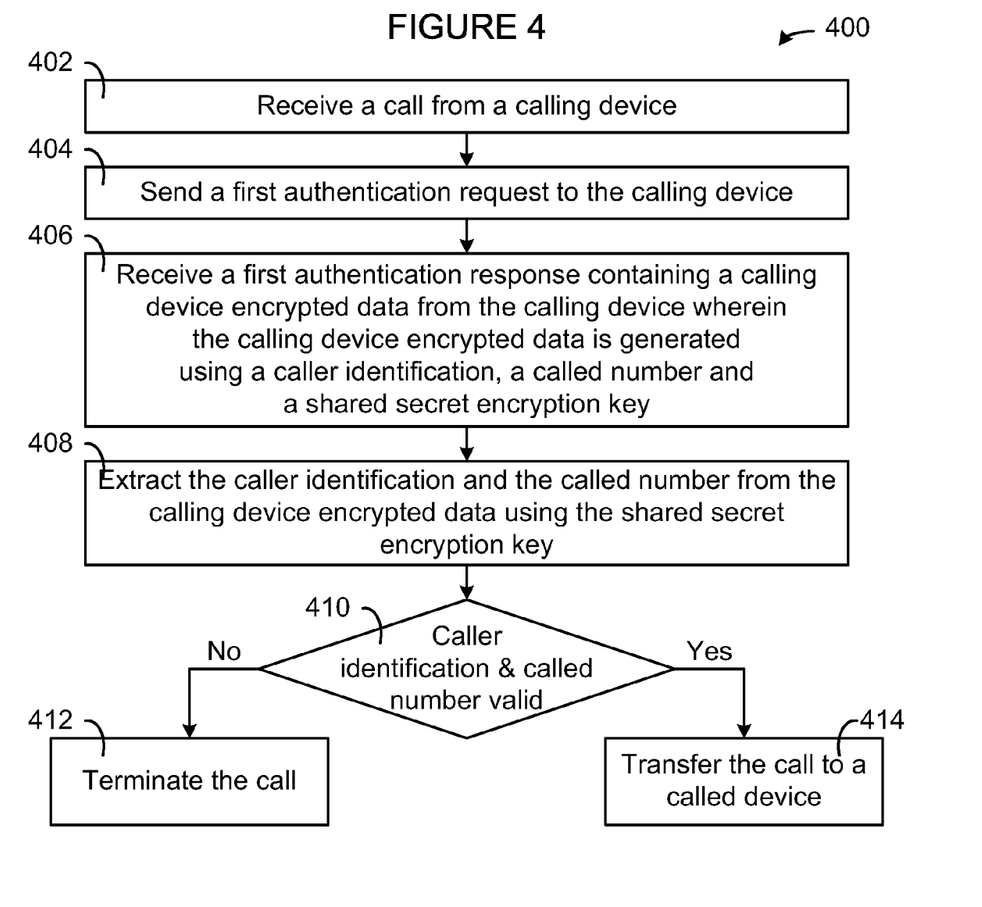
FIG. 4 is a flow chart depicting a method for authenticating a calling device in accordance with one embodiment of the present invention.

Now referring to FIG. 4, a flow chart depicting a method 400 for authenticating a calling device 106 in accordance with one embodiment of the present invention is shown. The AVC 104 receives a call from the calling device 106 in block 402 and sends a first authentication request to the calling device 106 in block 404. Thereafter, the AVC 104 receives a first authentication response containing a calling device encrypted data from the calling device 106 in block 406. The calling device encrypted data is generated by the calling device 106 using a caller identification (e.g., calling number), a called number and the shared secret encryption key. Other data can be used in the generation of the calling device encrypted data, such as a random number provided by the AVC 104, the IMEI of the calling device 106, a random number provided by the calling device 106, or a combination thereof, etc. The AVC 104 extracts the caller identification and the called number from the calling device encrypted data using the shared secret encryption key in block 408. The AVC 104 determines whether the extracted caller identification and the extracted called number are valid in decision block 410. If the calling device 106 is not verified, as determined in decision block 410, the AVC 104 terminates the call in block 412. If, however, the calling device 106 is verified, as determined in decision block 410, the AVC 104 transfers the call to a called device or called party 108 in block 414. Note that this method can be implemented on a computer readable medium wherein the steps are performed by one or more code segments.

Figure 5:
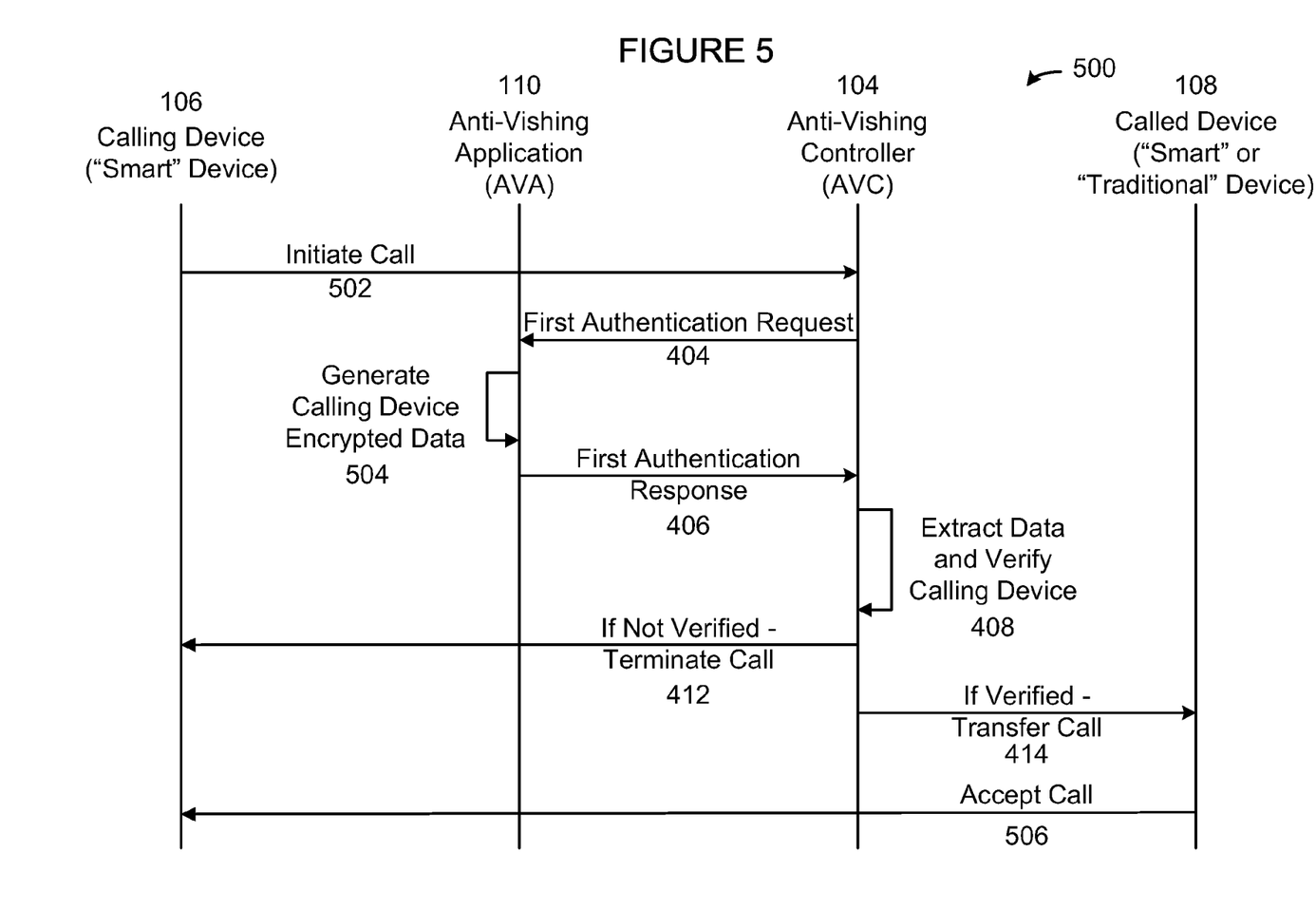
FIG. 5 is a signaling diagram depicting an authentication of a calling device in accordance with one embodiment of the present invention.

Referring now to FIG. 5, a signaling diagram 500 depicting an authentication of a calling device 106 in accordance with one embodiment of the present invention is shown. The calling device 106 initiates the call 502 to the called device 108, but is intercepted by the AVC 104. In response, the AVC 104 sends a first authentication request 404 to the calling device 106. The first authentication request may include a controller generated random number or controller generated encryption key. The AVA 110 loaded on the calling device 106 receives the first authentication request 404, generates the calling device encrypted data 504 and sends a first authentication response 406 containing the calling device encrypted data 504 to the AVC 104. As previously described, the calling device encrypted data 504 can be generated using the caller identification (e.g., calling number), the called number, the called device generated encryption key, the controller generated encryption key, the shared secret encryption key, etc. or a combination thereof. The first authentication response 406 may include a calling device generated encryption key or a calling device random number in addition to the calling device encrypted data 504. The AVC 104 extracts the caller identification and the called number from the encrypted data 504 using the shared secret encryption key and determines whether the extracted caller identification and the extracted called number are valid (collectively 408). The call is terminated 412 whenever the calling device 106 AVA 110 is not valid. The call is transferred 414 to the called party or called device 108 whenever the extracted caller identification and the extracted called number are valid. The called device or called party 108 then can accept (answer) or deny (do not answer) or transfer (e.g., voicemail) the call 506. It is possible for the AVA 110 to initiate the authentication. In that case, the same algorithm works except that the roles are reversed.

For example, when a user makes a call from cell phone 106, the resident AVA client 110 traps the dialed digits and generates a hash of caller ID and dialed digits using the shared secret encryption key stored in the AVA client 110. This encryption key is unique and different for each AVA 110. On receiving the call AVC 104 in the network sends request for the hash using either in-band or out-of-band methods. Upon receiving the request, the AVA 110 sends back computed hash either through in-band or out-of-band. The AVC 104 extracts the Caller ID and dialed digits from received hash using the same secret encryption key and verifies against the caller ID and called party number. This ensures that the Caller ID is not spoofed and no man-in-the-middle. The algorithm computes the hash per transaction such that it is unique per transaction and cannot be replayed later. Similarly, the AVA 110 can authenticate the called number. AVA 110 interacts with the user and the call data in the phone 106 to determine if the called party needs to be verified. Now the AVC 104 responds with a hash that includes the Called Party Number and Caller ID and Dialed Digits.

Figure 6:
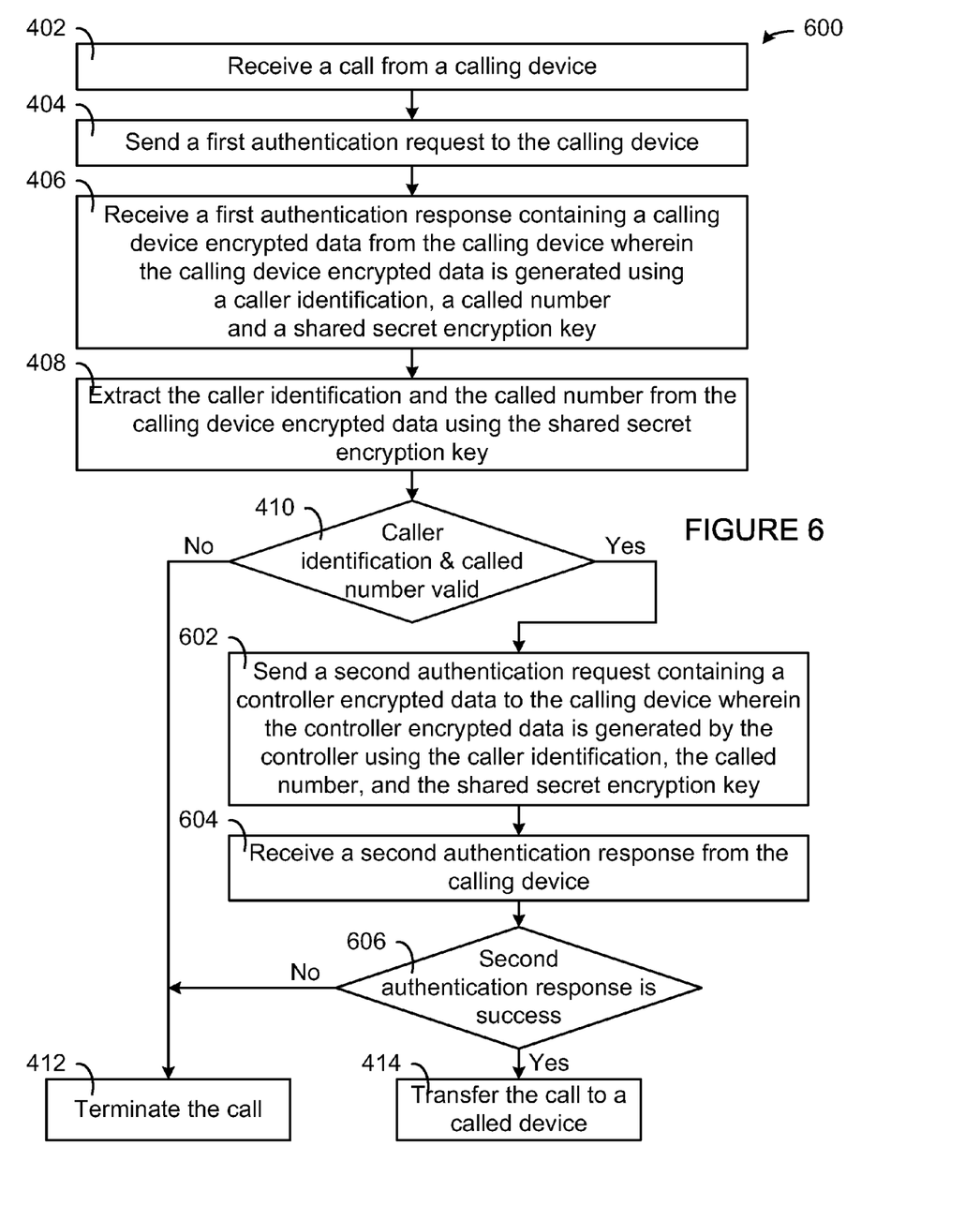
FIG. 6 is a flow chart depicting a method for authenticating a calling device in accordance with another embodiment of the present invention.

Now referring to FIG. 6, a flow chart depicting a method 600 for authenticating a calling device 106 in accordance with another embodiment of the present invention is shown. The AVC 104 receives a call from the calling device 106 in block 402 and sends a first authentication request to the calling device 106 in block 404. Thereafter, the AVC 104 receives a first authentication response containing a calling device encrypted data from the calling device 106 in block 406. The calling device encrypted data is generated by the calling device 106 using a caller identification (e.g., calling number), a called number and the shared secret encryption key. Other data can be used in the generation of the calling device encrypted data, such as a random number provided by the AVC 104, the IMEI of the calling device 106, a random number provided by the calling device 106, or a combination thereof, etc. The AVC 104 extracts the caller identification and the called number from the calling device encrypted data using the shared secret encryption key in block 408. The AVC 104 determines whether the extracted caller identification and the extracted called number are valid in decision block 410. If the calling device 106 is not verified, as determined in decision block 410, the AVC 104 terminates the call in block 412. If, however, the calling device 106 is verified, as determined in decision block 410, the AVC 104 sends a second authentication request containing a controller encrypted data to the calling device 106 in block 602. The controller encrypted data is generated by the controller 104 using a caller identification (e.g., calling number), a called number and the shared secret encryption key. Other data can be used in the generation of the controller encrypted data, such as a random number provided by the AVC 104, a random number provided by the calling device 106, or a combination thereof, etc. Thereafter, AVC 104 receives a second authentication response indicating success or failure from the calling device 106 in block 604. If the second authentication response indicates failure, as determined in decision block 606, the AVC 104 terminates the call in block 412. If, however, the second authentication response indicates success, as determined in decision block 606, the AVC 104 transfers the call to a called device or called party 108 in block 414. Note that this method can be implemented on a computer readable medium wherein the steps are performed by one or more code segments.

Figure 7:
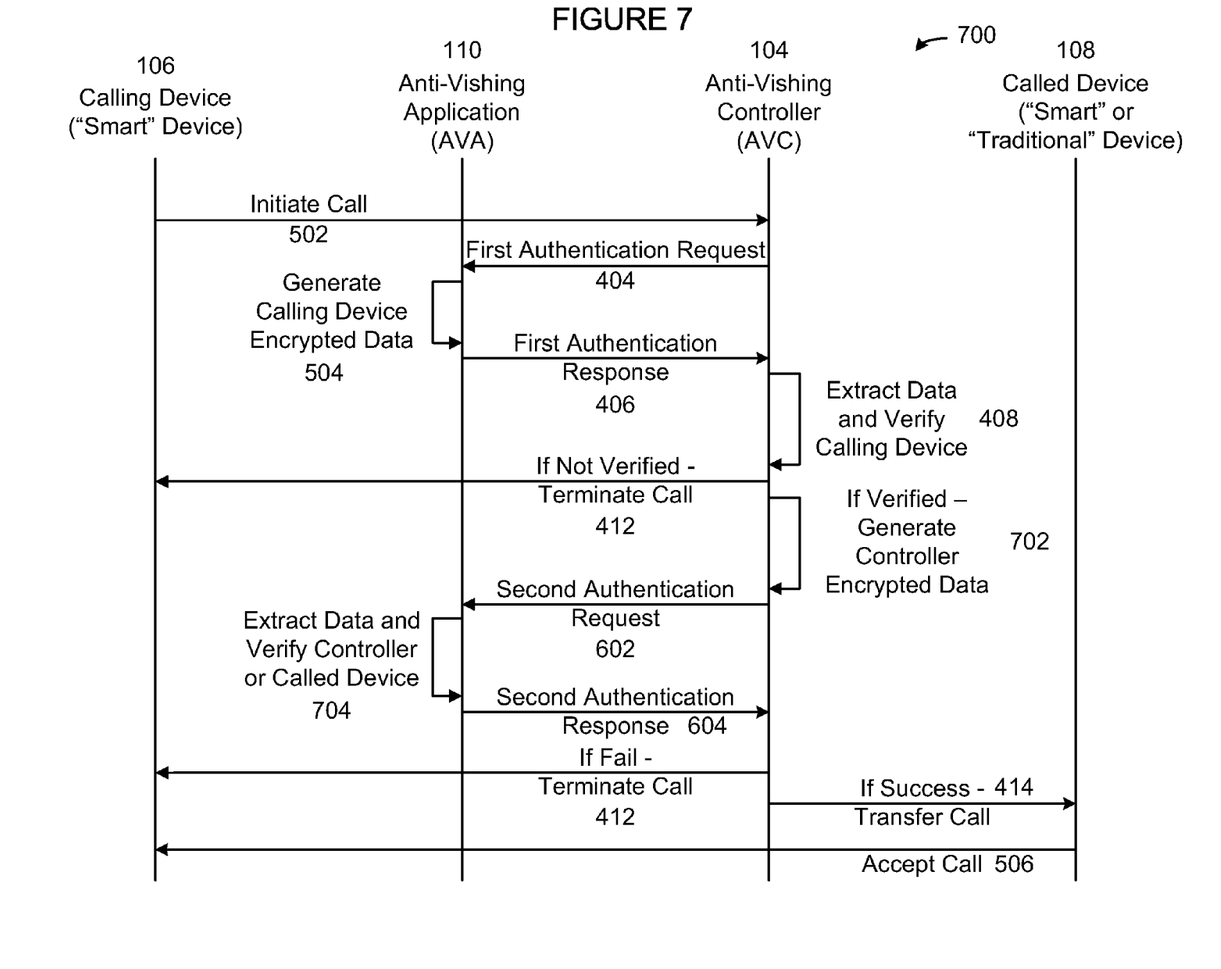
FIG. 7 is a signaling diagram depicting an authentication of a calling device in accordance with another embodiment of the present invention.

Referring now to FIG. 7, a signaling diagram 700 in accordance with another embodiment of the present invention is shown. This embodiment implements mutual authentication of the endpoints. The calling device 106 initiates the call 502 to the called device 108, but is intercepted by the AVC 104. In response, the AVC 104 sends a first authentication request 404 to the calling device 106. The first authentication request may include a controller generated random number or controller generated encryption key. The AVA 110 loaded on the calling device 106 receives the first authentication request 404, generates the calling device encrypted data 504 and sends a first authentication response 406 containing the calling device encrypted data 504 to the AVC 104. As previously described, the calling device encrypted data 504 can be generated using the caller identification (e.g., calling number), the called number, the called device generated encryption key, the controller generated encryption key, the shared secret encryption key, etc. or a combination thereof. The first authentication response 406 may include a calling device generated encryption key or a calling device random number in addition to the calling device encrypted data 504. The AVC 104 extracts the caller identification and the called number from the encrypted data 504 using the shared secret encryption key and determines whether the extracted caller identification and the extracted called number are valid (collectively 408). The call is terminated 412 whenever the calling device 106 AVA 110 is not valid.

The AVC 104 generates a controller device encrypted data 702 whenever the extracted caller identification and the extracted called number are valid. The controller device encrypted data can be generated using the caller identification (e.g., calling number), the called number, the called device generated encryption key, the controller generated encryption key, the shared secret encryption key, etc. or a combination thereof. The AVC 104 sends a second authentication request 602 to the calling device 106 AVA 110. The calling device 106 AVA 110 extracts the data and verifies the controller 104 or called device 108 (collectively 704) and sends a second authentication response 604 to the AVC 104. The AVC 104 terminates the call 412 whenever the second authentication response 604 indicates failure. The AVC 104 transfers the call 414 to the called party or called device 108 whenever the second authentication response 604 indicates success. The called device or called party 108 then can accept (answer) or deny (do not answer) or transfer (e.g., voicemail) the call 506. It is possible for the AVA 110 to initiate the authentication. In that case, the same algorithm works except that the roles are reversed.

For example, the requests and response may include the following information:

---

First authentication request 404 = Server_Random
where Server_Random is 'n' Pseudo Random digits generated on AVC 104
where the value of 'n' depends on the setup time desired.

-continued

First authentication response 406 = Client_Random + Client_Auth_Data
    where Client Random is Pseudo Random digits generated on the phone where the
        value of 'n' depends on the setup time desired, and
            Client_Auth_Data is First 'm' digits of HMAC_MD5(Shared_Secret,
            Caller_Number + Called_Number [+ IMEI] + Client Random +
            Server_Random) where the value of 'm' depends on the setup time. IMEI
            is added in case of Smart phones.
Second authentication request 602 = Server_Auth_Data or Auth_Failure
    where Server_Auth_Data is First 'm' digits of HMAC_MD5(Shared_Secret,
        Called_Number + Caller_Number + Server_Random + Client_Random)
        where the value of 'm' depends on the setup time desired. IMEI/MIN is
        added in case of Smart phones, and
        Auth_Failure is Call be terminated.
Second authentication response 604 = Auth_Success or Auth_Failure
    where Auth_Success: Call will be transferred.

Figure 8:
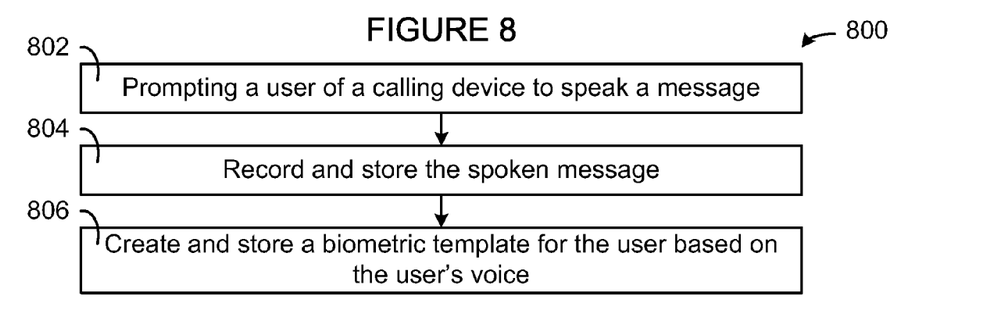
FIG. 8 is a flow chart depicting a registration process for a user in accordance with another embodiment of the present invention.

Now referring to FIG. 8, a flow chart depicting a registration process 800 for a user in accordance with another embodiment of the present invention is shown. When a user registers his/her voice or the calling device 106 or 112 for the first time, the user preferably goes through a validation process which requires a voice prompt to be recorded on the AVC 104. During registration, the user will be authenticated using standard procedures (such as calling from a home phone number or teller assisted procedures). Once the user is authenticated, the user will be prompted to record his voice. The user will be educated to expect this message whenever he/she logs in to access his/her account over the telephone. The voice prompt serves two purposes. The first purpose is that it helps to validate biometrics and the second purpose is that it validates the AVC 104. More specifically, after the user initiates the registration process 800, the user of a calling device 106 or 112 is prompted to speak a message in block 802. The spoken message is recorded and stored in block 804. A biometric template based on the user's voice is then created and stored for the user in block 806. The registration process 800 may also include periodically changing the stored message by prompting the calling party or user to speak a new message, and recording the new message and replacing the message with the new message. Note that the stored message should not be played to the calling party or user until the calling party or user is authenticated. As a result, the present invention prevents caller ID spoofing, man-in-the-middle attacks, record and replay attacks, called party impersonation, or a combination thereof.

When the user makes a call to the bank or financial entity, the resident AVC 104 first terminates the call and calls back the user. This procedure prevents Caller ID spoofing if any. Once the user answers the call the AVC 104 requests the user to speak a randomly generated phrase and sequence of dialed digits. When the phrase is repeated by the user, the AVC 104 validates biometrics, content of the phrase, and the sequence of dialed digits against the called party number. This prevents man-in-the-middle and record and replay attacks. Once this validation is complete, the AVC 104 plays the prompt recorded by the user during registration process. The user now should validate the prompt before proceeding further with the call to divulge any important information. This step prevents any called party impersonation. The prompt could change frequently to prevent any replay attacks. Just like the case with email phishing, this algorithm requires certain modifications to user behavior when making calls related to financial matter or other important matters. The users voice recorded on the Bank's server will be refreshed to avoid any recording and replay through foul play. This algorithm ensures that the media recorded on the server is not played before the user is authenticated. Authentication on traditional phones relies on user voice recognition. Users are authenticated using voice biometric systems. The user authenticates the bank by hearing his/her own voice that was recorded by him/her during registration. The user will be prompted to refresh this recording periodically.

Figure 9:
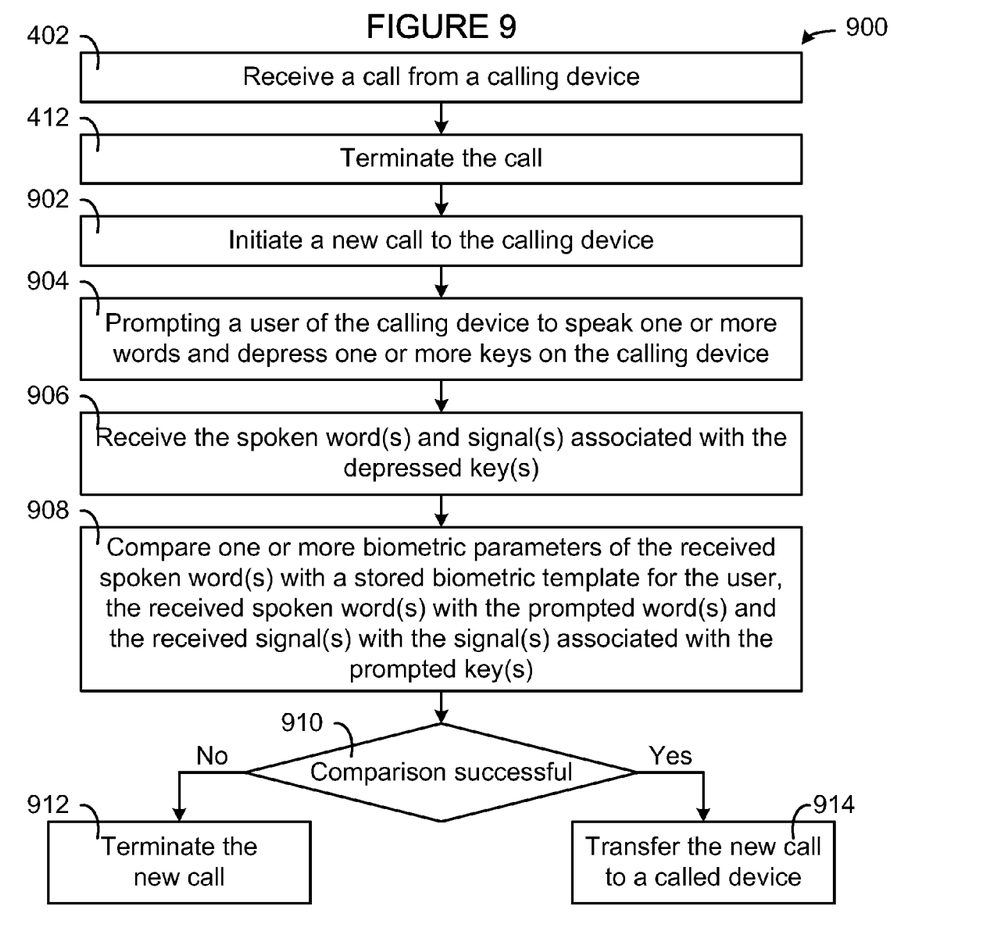
FIG. 9 is a flow chart depicting a method for authenticating a user of a calling device in accordance with another embodiment of the present invention.

Referring now to FIG. 9, a flow chart depicting a method 900 for authenticating a user of a calling device 112 in accordance with another embodiment of the present invention is shown. Note that this method can also be used with a calling device 106. The AVC 104 receives a call from the calling device 112 via the communications interface in block 402 and terminates the call in block 412. Thereafter, the AVC 104 initiates a new call to the calling device 112 via the communications interface in block 902. The AVC 104 then prompts the user of the calling device 112 to speak one or more words and depress one or more keys on the calling device in block 904, and receives the spoken words and one or more signals associated with the depressed keys via the communication interface in block 906. The AVC 104 authenticates the user of the calling device 112 by comparing one or more biometric parameters of the received spoken words with a stored voice biometric template for the calling device 112, the received spoken words with the prompted words and the received signals with the signals associated with the prompted keys in block 908. If the comparison is not successful, as determined in decision block 910, the new call is terminated in block 912. If, however, the comparison is successfully, as determined in decision block 910, the AVC 104 transfers the new call to the called device or called party 108 in block 914. Note that this method can be implemented on a computer readable medium wherein the steps are performed by one or more code segments.

Figure 10:
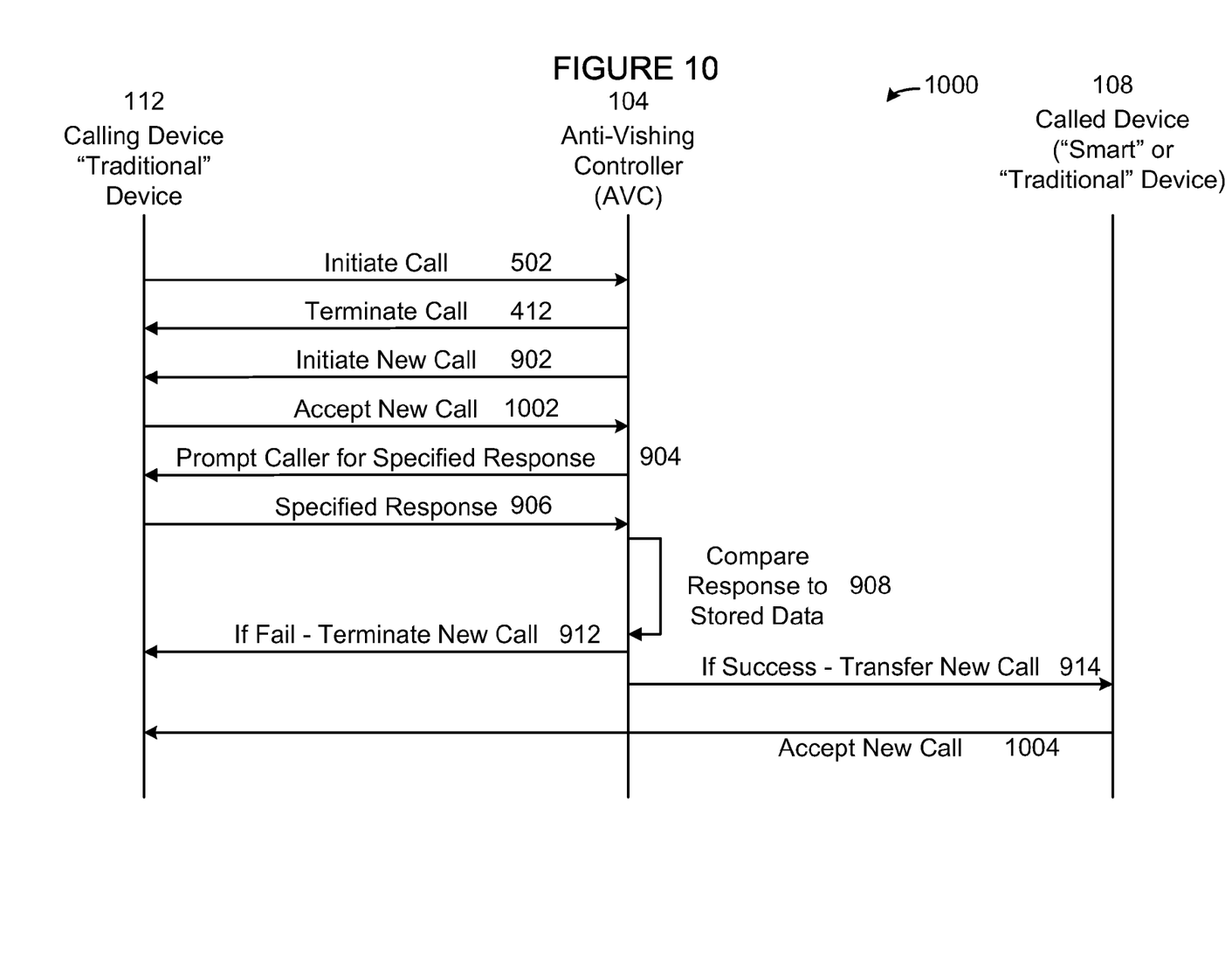
FIG. 10 is a signaling diagram depicting an authentication of a user of a calling device in accordance with another embodiment of the present invention.

Now referring to FIG. 10, a signaling diagram 1000 depicting an authentication of a user of a calling device 112 in accordance with another embodiment of the present invention is shown. The user or calling party initiates a call 502 to the called device or called party 108 using a traditional calling device 112. The AVC 104 terminates the call 412 and initiates a new call 902 to the traditional calling device 112. Note that the AVC 104 may provide a notification to the traditional calling device 112 that the authentication process will begin following the termination of the current call 412. The traditional calling device 112 accepts the call 1002 and the user of the calling device 112 is prompted 904 to speak one or more words and depress one or more keys on a calling device. The one or more words and the one or more keys can be randomly generated by the AVC 104. The one or more keys can be selected from one or more digits of a telephone number of the called party, and the one or more keys can be selected from the 0-9, * and # keys. The spoken words and one or more signals associated with the depressed keys are received 906 by the AVC 104. One or more biometric parameters of the received spoken words are compared 908 with a stored voice biometric template for the user or calling party, the received spoken words are compared with the prompted words and the received signals are compared with the signals associated with the prompted keys. The new call is terminated 912 if the comparison fails. In addition, one or more notifications can be logged or sent to the called device or called party 108 whenever the user or calling party is not authenticated. The new call is transferred 914 to a called party whenever the user or calling party is authenticated as a result of the comparison 908. The called device or called party 108 then can accept (answer) or deny (do not answer) or transfer (e.g., voicemail) the new call 1004.

Figure 11:
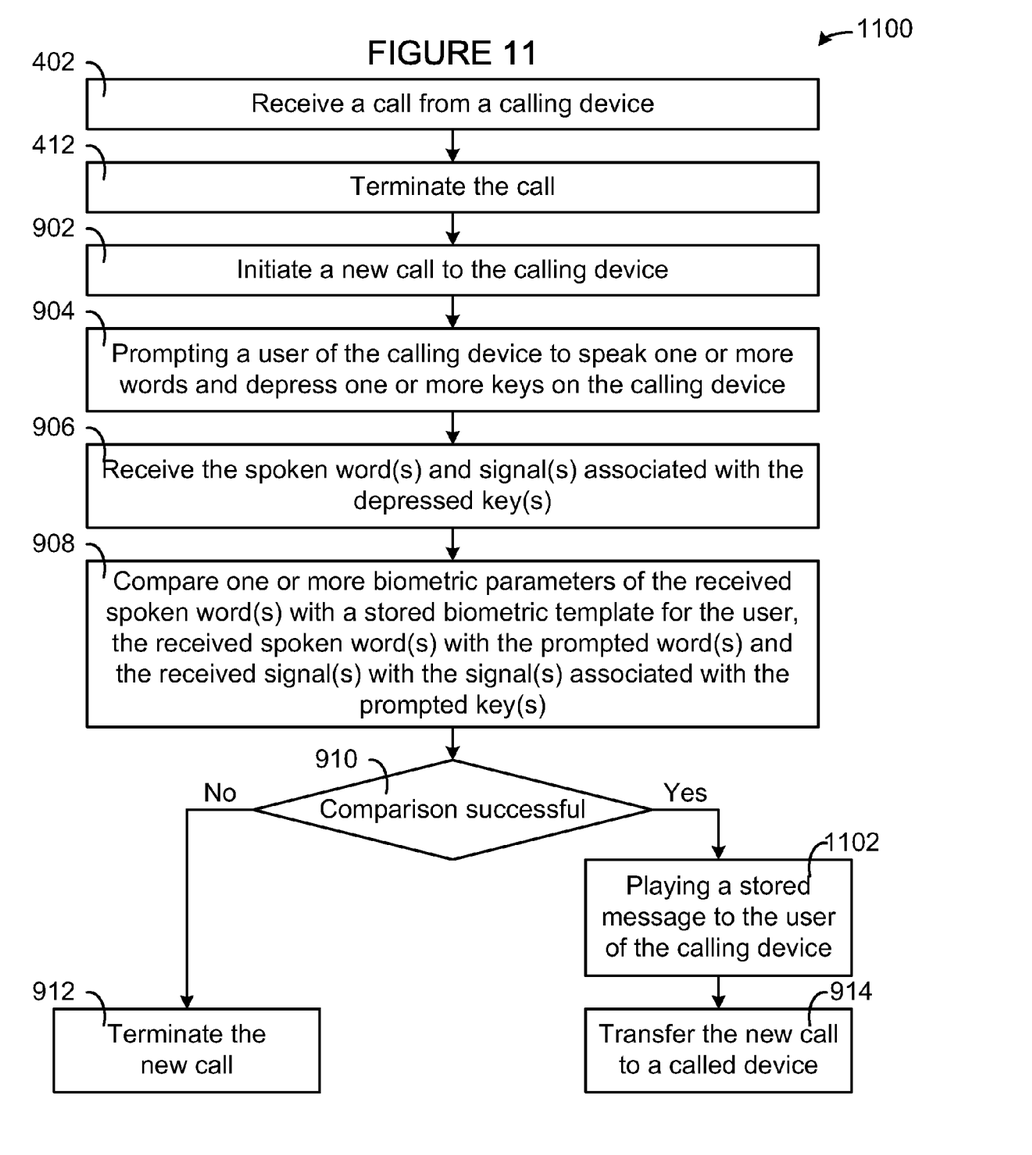
FIG. 11 is a flow chart depicting a method for authenticating a user of a calling device in accordance with another embodiment of the present invention.

Referring now to FIG. 11, a flow chart depicting a method 1100 for authenticating a user of a calling device 112 in accordance with another embodiment of the present invention is shown. Note that this method can also be used with a calling device 106. The AVC 104 receives a call from the calling device 112 via the communications interface in block 402 and terminates the call in block 412. Thereafter, the AVC 104 initiates a new call to the calling device 112 via the communications interface in block 902. The AVC 104 then prompts the user of the calling device 112 to speak one or more words and depress one or more keys on the calling device in block 904, and receives the spoken words and one or more signals associated with the depressed keys via the communication interface in block 906. The AVC 104 authenticates the user of the calling device 112 by comparing one or more biometric parameters of the received spoken words with a stored voice biometric template for the calling device 112, the received spoken words with the prompted words and the received signals with the signals associated with the prompted keys in block 908. If the comparison is not successful, as determined in decision block 910, the new call is terminated in block 912. If, however, the comparison is successfully, as determined in decision block 910, the AVC 104 plays a stored message to the user of the calling device 112 to authenticate the called party or called device 108 in block 1102 and transfers the new call to the called device or called party 108 in block 914. Note that this method can be implemented on a computer readable medium wherein the steps are performed by one or more code segments.

Figure 12:
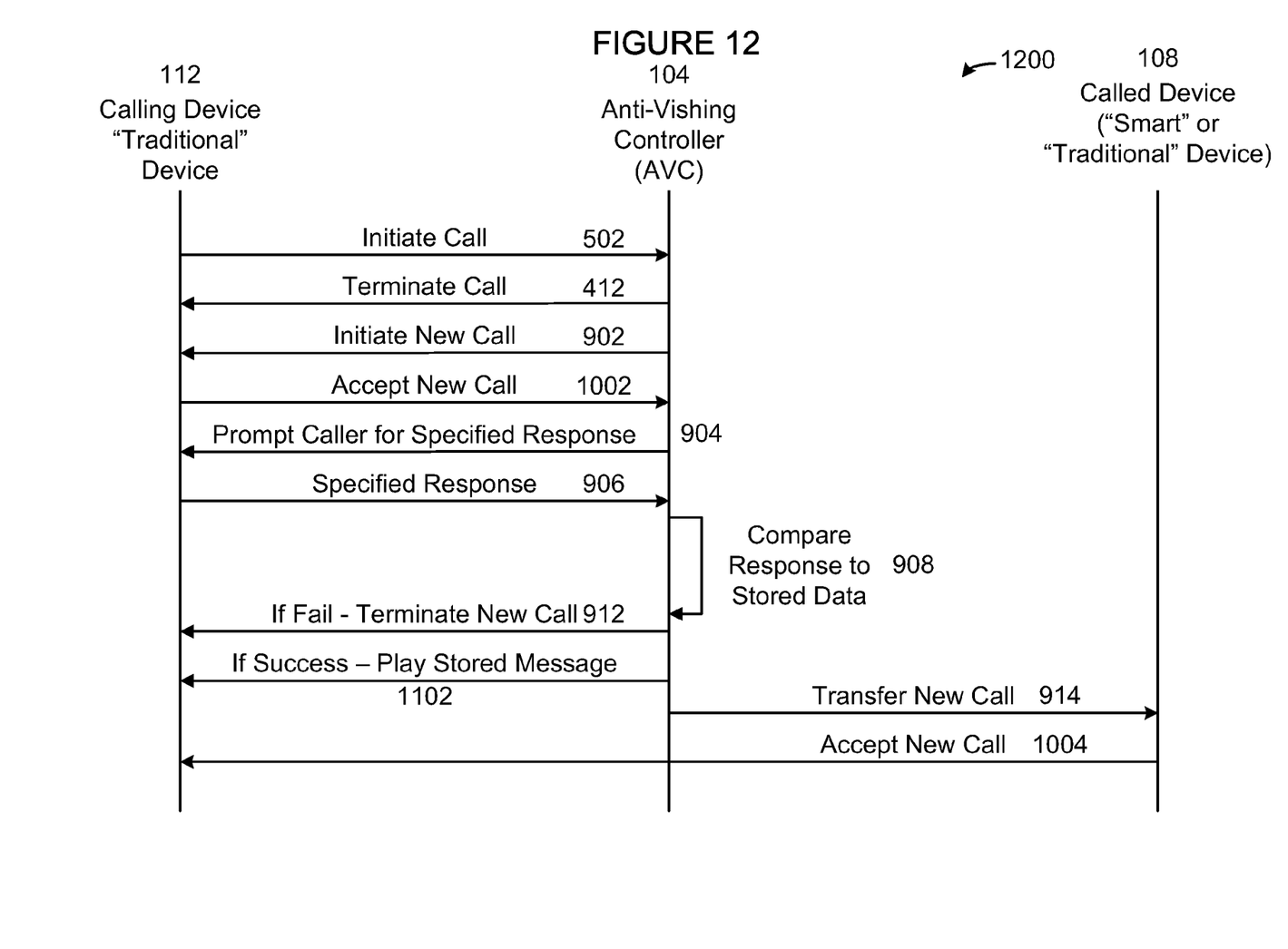
FIG. 12 is a signaling diagram depicting an authentication of a user of a calling device in accordance with another embodiment of the present invention.

Now referring to FIG. 12, a signaling diagram 1200 depicting an authentication of a user of a calling device 112 in accordance with another embodiment of the present invention is shown. The user of the calling device 112 initiates a call 502 to the called device or called party 108 using a traditional calling device 112. The AVC 104 terminates the call 412 and initiates a new call 902 to the traditional calling device 112. Note that the AVC 104 may provide a notification to the traditional calling device 112 that the authentication process will begin following the termination of the current call 412. The traditional calling device 112 accepts the call 1002 and the user of the calling device 112 is prompted 904 to speak one or more words and depress one or more keys on a calling device. The one or more words and the one or more keys can be randomly generated by the AVC 104. The one or more keys can be selected from one or more digits of a telephone number of the called party, and the one or more keys can be selected from the 0-9, * and # keys. The spoken words and one or more signals associated with the depressed keys are received 906 by the AVC 104. One or more biometric parameters of the received spoken words are compared 908 with a stored voice biometric template for the user or calling party, the received spoken words are compared with the prompted words and the received signals are compared with the signals associated with the prompted keys. The new call is terminated 912 if the comparison fails. In addition, one or more notifications can be logged or sent to the called device or called party 108 whenever the user or calling party is not authenticated. A stored message is played 1102 to the user or calling party to authenticate the called party or called device 108 if the comparison is successful. The stored message was previously recorded by the user or calling party during the registration process 800. The new call is then transferred 914 to the called device or called party 108 and the called device or called party 108 then accepts (answer) or denies (do not answer) or transfers (e.g., voicemail) the new call 1004.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for authenticating a calling device comprising the steps of:
   receiving a call from the calling device to a called device, at a controller, wherein the controller intercepts the call from the calling device to the called device;
   sending a first authentication request for the call from the controller to the calling device;
   receiving, at the controller, a first authentication response for the call from the calling device, wherein the first authentication response for the call comprises calling device encrypted data generated by the calling device, wherein the calling device encrypted data includes a hash of a caller identification for the calling device and a called number using a shared secret key;
   extracting, by the controller, the caller identification and the called number from the encrypted data using the shared secret encryption key;
   determining, by the controller, whether the extracted caller identification and the extracted called number are valid; and transferring, by the controller, the call to the called device in response to determining that the extracted caller identification and the extracted called number are valid.

2. The method as recited in claim 1, wherein:
the first authentication request for the call includes a controller generated encryption key;
the first authentication response for the call includes a calling device generated encryption key; and
wherein the calling device encrypted data is generated using the caller identification, a calling number, the called number, the controller generated encryption key, the calling device generated encryption key and the shared secret encryption key.

3. The method as recited in claim 1, further comprising the steps of:
registering the calling device; and
creating the shared secret encryption key.

4. The method as recited in claim 1, wherein the messages are exchanged using in-band communication channels, out-of-band communication channels, or a combination thereof.

5. A system for authenticating a calling device comprising:
a controller communicably coupled to a communications network wherein the controller comprises a communications interface communicably coupled to the communications network and a processor communicably coupled to the communications interface, and wherein the processor (a) receives a call from the calling device that is directed to a called device using a called number, wherein the call is intercepted by the controller, (b) sends a first authentication request to the calling device, (c) receives a first authentication response from the calling device, wherein the first authentication response comprises calling device encrypted data generated by the calling device comprising a hash of a caller identification, the called number and a shared secret encryption key, (d) extracts the caller identification and the called number from the encrypted data using the shared secret encryption key, (e) determines whether the extracted caller identification and the extracted called number are valid, and (f) transfers the call to the called device whenever the extracted caller identification and the extracted called number are valid.

6. The system as recited in claim 5, wherein the calling device further comprises an anti-vishing agent.

7. A method for authenticating a calling device comprising the steps of:
trapping by an agent on the calling device the called number;
receiving a call from the calling device to a called device, at a controller, wherein the controller intercepts the call from the calling device to the called device;
sending a first authentication request for the call from the controller to the calling device;
receiving, at the controller, a first authentication response for the call from the calling device, wherein the first authentication response for the call comprises calling device encrypted data generated by the calling device, wherein the calling device encrypted data includes a hash of a caller identification for the calling device and a called number using a shared secret key;
extracting, by the controller, the caller identification and the called number from the encrypted data using the shared secret encryption key;
determining, by the controller, whether the extracted caller identification and the extracted called number are valid; and
transferring, by the controller, the call to the called device in response to determining that the extracted caller identification and the extracted called number are valid, wherein the step of transferring the call to the called device whenever the extracted caller identification and the extracted called number are valid comprises the steps of:
in response to determining that the extracted caller identification and the extracted called number are valid, sending a second authentication request for the call to the calling device, wherein the second authentication request for the call comprises controller device encrypted data generated by a controller using the calling number, the called number, the controller generated encryption key, the calling device generated encryption key and the shared secret encryption key;
receiving a second authentication response for the call from the calling device;
transferring the call to the called device whenever the second authentication response for the call indicates success; and
terminating the call whenever the second authentication response for the call indicates failure.

8. The method as recited in claim 7, wherein:
the first authentication request for the call includes a controller generated encryption key;
the first authentication response for the call includes a calling device generated encryption key and the calling device encrypted data; and
wherein the calling device encrypted data is generated using the caller identification, a calling number, the called number, the controller generated encryption key, the calling device generated encryption key and the shared secret encryption key.

9. The method as recited in claim 7, further comprising the steps of:
registering the calling device; and
creating the shared secret encryption key.

10. The method as recited in claim 7, wherein the messages are exchanged using in-band communication channels, out-of-band communication channels, or a combination thereof.

* * * * *

UNITED STATES PATENT AND TRADEMARK OFFICE
CERTIFICATE OF CORRECTION

PATENT NO.         : 9,197,746 B2                                          Page 1 of 1
APPLICATION NO.    : 12/366630
DATED              : November 24, 2015
INVENTOR(S)        : Srikrishna Kurapati et al.

It is certified that error appears in the above-identified patent and that said Letters Patent is hereby corrected as shown below:

In The Specification

At Column 13, line(s) 47-48, please delete the phrase "trapping by an agent on the calling device the called number;"

Signed and Sealed this
Fifteenth Day of March, 2016

Michelle K. Lee
*Director of the United States Patent and Trademark Office*